(12) United States Patent
Kulkarni et al.

(10) Patent No.: US 8,468,548 B2
(45) Date of Patent: Jun. 18, 2013

(54) MULTI-TENANT, HIGH-DENSITY CONTAINER SERVICE FOR HOSTING STATEFUL AND STATELESS MIDDLEWARE COMPONENTS

(75) Inventors: Amol Kulkarni, Bothell, WA (US);
Girish Mittur Venkataramanappa, Redmond, WA (US); Yann Christensen, Seattle, WA (US); Chandra Prasad, Bellevue, WA (US); Dharma Shukla, Sammamish, WA (US); Sumit Mohanty, Redmond, WA (US); Vinod Shanbhag, Redmond, WA (US); Andreas Ulbrich, Kirkland, WA (US); Mandyam Kishore, Redmond, WA (US); Aditya Bhandarkar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 262 days.

(21) Appl. No.: 12/972,411

(22) Filed: Dec. 17, 2010

(65) Prior Publication Data
US 2012/0159523 A1 Jun. 21, 2012

(51) Int. Cl.
*G06F 13/00* (2006.01)
(52) U.S. Cl.
USPC ............ 719/316; 718/104; 709/213; 709/216
(58) Field of Classification Search
USPC .................... 719/316; 718/104; 709/213, 216
See application file for complete search history.

(56) References Cited

U.S. PATENT DOCUMENTS

| | | | |
|---|---|---|---|
| 6,789,114 B1 | 9/2004 | Garg et al. | |
| 8,020,177 B2 * | 9/2011 | Marsala et al. | 719/330 |
| 8,230,070 B2 * | 7/2012 | Buyya et al. | 709/226 |
| 2006/0242647 A1 | 10/2006 | Kimbrel et al. | |
| 2007/0005770 A1 * | 1/2007 | Kramer et al. | 709/226 |
| 2010/0005443 A1 | 1/2010 | Kwok et al. | |
| 2010/0077449 A1 | 3/2010 | Kwok et al. | |
| 2010/0125612 A1 | 5/2010 | Amradkar et al. | |
| 2010/0205595 A1 | 8/2010 | Weissman | |
| 2010/0306775 A1 | 12/2010 | Appiah et al. | |
| 2012/0158966 A1 * | 6/2012 | Eberlein et al. | 709/226 |

OTHER PUBLICATIONS

Naseem, Asif, "High Availabilty application ready platform design," Embedded Computing Design, Winter 2004, 4 pages.
Chase, Jeffrey S., et al., "Managing Energy and Server Resources in Hosting Centers," ACM, 2001, 14 pages.

(Continued)

*Primary Examiner* — Andy Ho
(74) *Attorney, Agent, or Firm* — Fogarty, L.L.C.

(57) ABSTRACT

A container service is capable of hosting large numbers of middleware components for multiple tenants. A central container manager controls a plurality of compute nodes. The central container manager receives middleware components from external devices or services and assigns the components to containers on one or more designated compute nodes. Each compute node has a container management agent and one or more containers. The container management agents activate and manage the appropriate number of containers to run the assigned middleware components. The container management agent assigns each container on its compute node a limited set of privileges to control access to shared resources. The central container manager and each node's container management agent monitor container load levels and dynamically adjust the placement of the middleware components to maintain balanced operation. The compute nodes are grouped into clusters based upon the type of middleware components hosted on each compute node.

18 Claims, 4 Drawing Sheets

OTHER PUBLICATIONS

Chen, Annie, et al., "Scaling Real-Time Telematics Applications using Programmable Middleboxes: A Case Study in Traffic Prediction," Jan. 8, 2004, 6 pages.

Othman, Ossama, et al., "Strategies for CORBA Middleware-Based Load Balancing," Mar. 2001, 11 pages.

"International Search Report", Mailed Date: Jun. 1, 2012, Application No. PCT/US2011/065666, Filed Date: Dec. 16, 2011, pp. 9.

* cited by examiner

MULTI-TENANT, HIGH-DENSITY CONTAINER SERVICE FOR HOSTING STATEFUL AND STATELESS MIDDLEWARE COMPONENTS

BACKGROUND

Distributed systems allow users to run applications hosted on distributed resources, such as a remote central processing unit (CPU), central server, or physical or virtual machine. Middleware services provide computation, coordination, information management, hosting and other support to the applications on the distributed resources. Middleware components are software applications or computer instructions that run on the distributed resources and that provide a service or implement protocols or algorithms for users. The middleware components may provide complex or specialized applications. The user interacts with the middleware components when a function provided by a middleware component is needed. The demand for the middleware components varies depending upon the users' needs. Accordingly, the middleware components running on the distributed resources may be idle if there is no user demand or, in cases of high user demand, the distributed resources may be unable to service all user needs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A container service capable of hosting large numbers of middleware components for multiple users or tenants is described and disclosed herein. The container service comprises a plurality of compute nodes and a central container manager. The compute nodes are managed as a cluster by the central container manager. Each compute node has a container management agent that manages one or more containers on the compute node. The central container manager receives middleware components from external devices or services and assigns the components to containers on one or more designated compute nodes. For each designated compute node, the container management agent on the designated compute node activates and manages an appropriate number of containers to run the middleware components assigned to the designated node. The container service provides an efficient, high-density operation by hosting a large number of middleware components on a select set of compute nodes. This allows the compute nodes' active resources to operate at a high usage level or high load factor under control of the container management agent, which reduces the costs associated with hosting the middleware components by increasing efficiency. Instead of distributing the middleware components across all of the compute nodes randomly, only the required resources are activated and the remaining compute nodes and resources are idle until needed to support additional middleware components. The central container manager and each node's container management agent react to changes in the container load level by dynamically adjusting the placement of the middleware components on specific nodes with the cluster.

The container service can simultaneously provide compute node resources to a plurality of tenants. Each container hosts middleware components belonging to different tenants and provides each set of components access to a shared set of compute resources at the same time. Multi-tenancy is achieved by isolating different sets of middleware components from each other and ensuring balanced resource distribution across all component sets.

The container service allows for efficient scale-out of both stateless and stateful components. The containers provide a programming model and infrastructure that allows for partitioning to enable stateful middleware components to scale effectively. The containers also provide scale-out of stateless components via cloning. Accordingly, when additional resources are required for middleware components, additional containers are assigned for such components. Partitions of stateful components are redistributed to use this additional capacity. For stateless components, additional clones are created to use this additional capacity.

The container service ensures that the middleware components have a high-availability. The central container manager distributes primary and secondary instances of the middleware components across fault domains. The secondary instance of a middleware component is activated in case the primary instance is unavailable due to node failures or shutdowns for infrastructure updates.

DRAWINGS

DETAILED DESCRIPTION

Traditionally, distributed resources have been dedicated to specific users. The resources that are assigned to a particular user may be idle or underutilized when they are not required by the user. Thus even when an assigned resource is idle, it may not be available to other users who have been assigned to a different set of resources. If a user is using the assigned resources to full capacity, then the user's workload is restricted if additional resources are not available to the user. A container service that allows users to access additional resources on an as-needed basis provides flexibility to users.

Figure 1:
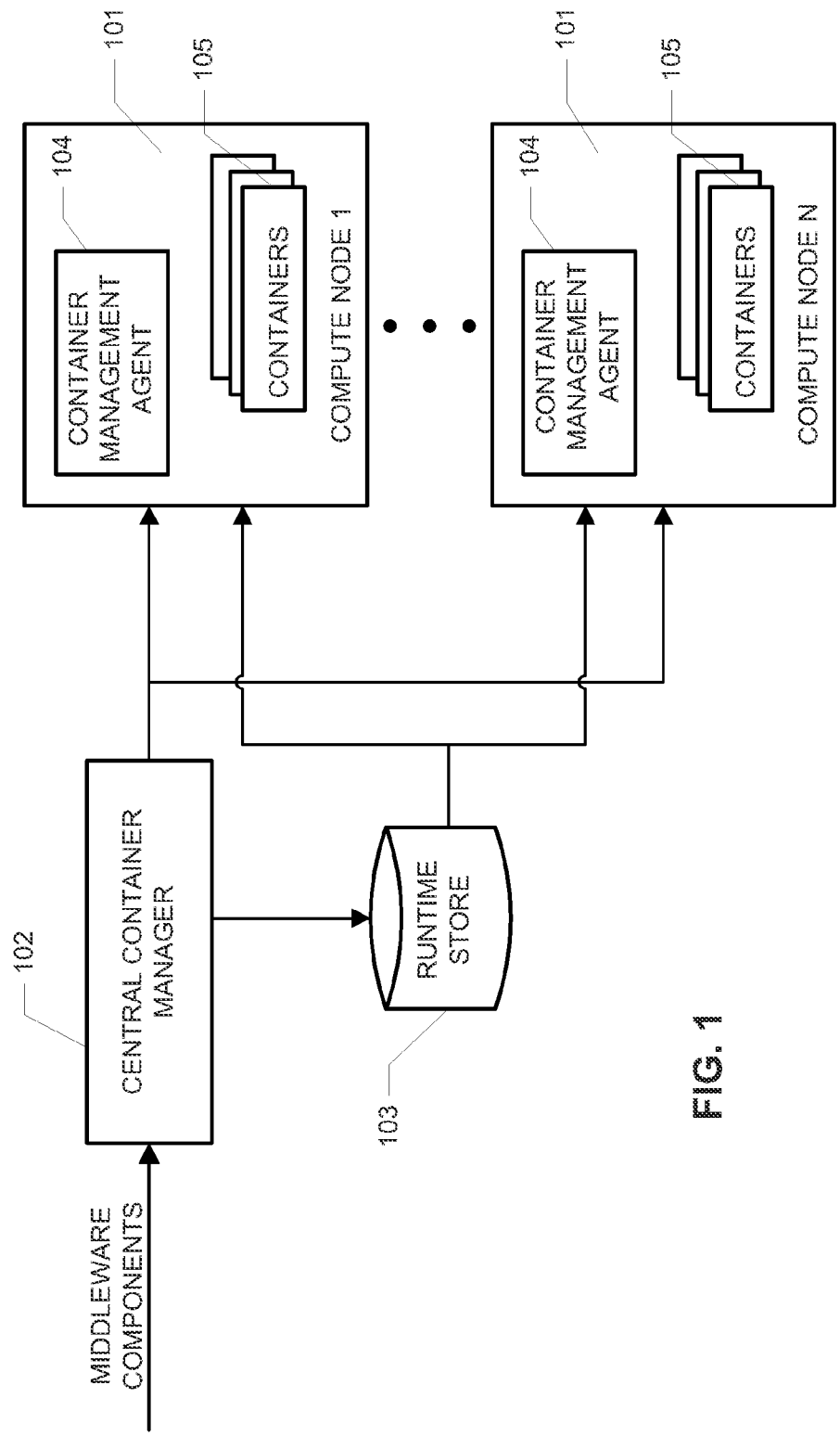
FIG. 1 is a block diagram illustrating an exemplary embodiment of a container service.

FIG. 1 is a block diagram illustrating an exemplary embodiment of the container service 100 disclosed herein. The container service is provided using a plurality of compute nodes 101 managed together as a cluster by a central container manager 102. The compute nodes 101 may be physical or virtual machines. A virtual machine is a software application that simulates the operation of hardware resources, such as a processor, memory and storage devices, and peripheral resources. Central container manager 102 is supported by a runtime store 103 that stores middleware components.

Each compute node 101 includes a container management agent 104 and one or more containers 105. One container management agent 104 runs on each compute node 101 within the cluster. The container management agent 104 communicates with the other container management agents on all the other nodes in the cluster. In one embodiment, compute nodes 101 are physical or virtual machines each having similar capacities and capabilities. However, in other embodiments, the compute nodes may be diverse devices having varying capacities and capabilities.

Central container manager 102 receives middleware components from an external device or service, such as a composite application service. A composite application service is a multi-tenant, managed service that automates the deployment and management of an application, and that directly executes application components. The middleware components may belong to different tenants. The term "tenants" as used herein refers to the users of the container service, including, without limitation, applications, clients, subscribers, customers, or companies that access the container service. The central container manager 102 uploads new middleware components from the tenants to runtime store 103 and notifies individual container management agents 104 of the newly received components. The central container manager 102 designates one or more containers 105 to run the middleware components. The containers are distributed across one or more compute nodes 101 in the cluster. Upon receiving notice from the central container manager 102 that components will be placed on a particular compute node 101, the container management agent 104 associated with that node activates a container 105. The container management agent 104 and compute node 101 host the new middleware component in this newly activated container 105.

To provide a secure environment, the container management agents 104 and compute nodes 101 isolate the middleware components from each other by running each middleware component in its own container. Containers on the same node share the resources available for that node. Central container manager 102 and the container management agents 104 measure the resource usage for each container. Central container manager 102 and the container agents 104 balance the allocation of the shared resources by dynamically adjusting the load across the compute nodes 101. The use of containers 105 distributed among compute nodes 101 provides high availability for the middleware components and enables scale-out for components that require either partitioning or cloning as described below.

Central container manager 102 may be a software application or program code running on a physical machine, such as CPU or server, or on a virtual machine. Compute nodes 101 may be embodied as physical or virtual machines. Compute nodes 101 may be hosted on the same physical machine or on a plurality of separate physical machines that reside in the same or different locations. Containers 105 operate in isolation from each other on compute nodes 101 to avoid interference among the middleware components or module instances running in separate containers and to ensure that each container has a fair share of access to the resources on compute node 101.

Runtime store 103 may comprise any computer storage media using any now-known or later-developed technology, system, or method for storage of information, such as middleware components, computer readable instructions, data structures, program modules or other data. Runtime store 103 may be embodied in any medium that can be used to store information and that can be accessed by central container manager 102 or compute nodes 101. Computer storage media may include, for example, any volatile or non-volatile media, such as RAM, ROM, electrically erasable program read-only memory (EEPROM), flash memory, CD-ROM, DVD, magnetic cassettes, magnetic tape, magnetic disk storage, or other optical or magnetic storage devices.

Load Balancing.

In one embodiment, a compute node 101 may include CPU, memory, disc input/output (I/O) and network I/O resources. The container management agent 103 limits each container's 105 access to these resources so that multiple containers 105 can run on a given compute node 101 without adversely affecting other the containers 105 that are active on that node. The container management agents 104 enforce limits on CPU and memory usage, for example, to ensure that each container has a fair share of the compute node's resources. The container management agent 104 may also restrict each container 105 so that the containers access only specific disc and network resources on the compute node 101.

Periodically, the central container manager 102 measures the load generated by each middleware component across the cluster. Central container manager 102 balances the total load on each compute node 101 by moving components from compute nodes 101 having a higher load to nodes having a lower load. The use of periodic load balancing provides optimal capacity utilization and enables hosting middleware components on a smaller set of nodes within the cluster.

Sandboxing.

The containers 105 are "sandboxed" by the container management agent 104 so that each container receives its fair share of the compute node resources and no more. This ensures that containers 105 do not adversely affect each other even though they are running on the same compute node 101 and sharing the same resources. As a result, one container 105 is not slowed down or denied service by the other containers 105 on the compute node 101. Sandboxing isolates the middleware components from each other so that no component affects the operation of the other components. Additionally, sandboxing prevents any container 105 from modifying another container's files or data on the shared resources. Sandboxing is provided on the compute nodes by the container management agent 104, which assigns a restricted set of privileges to each container 105. Any unnecessary privileges are removed from the set of privileges assigned to each container. In one embodiment, container management agent 104 controls access to local disc resources using access control lists. Network access is controlled by container management agent 104 using a kernel mode filter that monitors incoming and outgoing traffic on a specific port for a specific process and allows traffic only to/from a specific list of network resources. This tight sandboxing enables middleware components from multiple tenants to be hosted on a shared set of nodes.

Node States.

The compute nodes 101 are designated as being either stateless or stateful. The compute nodes are grouped together with other nodes having the same state type. The state type affects the selection of middleware components that are assigned to a particular compute node. Stateful nodes are used for middleware components that have a state stored in memory and/or coordinated with an external resource, such as a database. The state is used to track connections, interactions or current values relevant to a middleware component assigned to the node. Stateless nodes are used for middleware components that do not retain information or rely on stored values.

Container Scale-Out.

Containers provide two methods for the middleware components to be scaled-out: cloning and partitioning. Stateless middleware components scale using cloning. When a middleware component selects cloning, it also specifies a count of the clones that it requires. The container then activates the middleware component on n nodes, where n is the number of clone instances required for the component. Stateful middleware components scale using partitioning. Stateful middleware components cannot simply be copied or cloned because the stateful components must reference one or more "states" that are stored in memory. For stateful middleware components, the term "partitions" refers to additional instances of the middleware component, where each instance relies on state stored in memory. The container places the partitions across a set of nodes based on a scale-out count, which specifies the number of nodes over which partitions of a component should be distributed. Once partition placement is finalized, the middleware components are loaded in containers on the specific nodes. Middleware components may select a predetermined partitioning policy available on the container service, or the components may specify a custom partitioning plan.

Partition-based scale-out is available to middleware components via selectable/extensible partition policies and a partition-aware routing infrastructure on the container. Each middleware component can have one or more ports or endpoints on which it listens for incoming messages. Each such port or endpoint is assigned a physical address when the middleware component is activated. Each port or endpoint also has a logical address that is used by tenants to send messages to the middleware component. A mapping of logical addresses to physical addresses for each partition is stored in an address resolution service. When tenants need to send a message to a middleware component port or endpoint, a partition key generation function is applied to the message to obtain the value of the partition key. This partition key value is then used with the partition policy to find the specific partition to which the message should be sent. The physical address for the specific partition is obtained by consulting the address resolution service. The container integrates with the underlying compute node clustering technology to ensure that each partition is exclusively allocated to only one node at any given instance. For example, the container management agents communicate to verify that each stateful middleware component partition is allocated to a single specific node.

Figure 2:
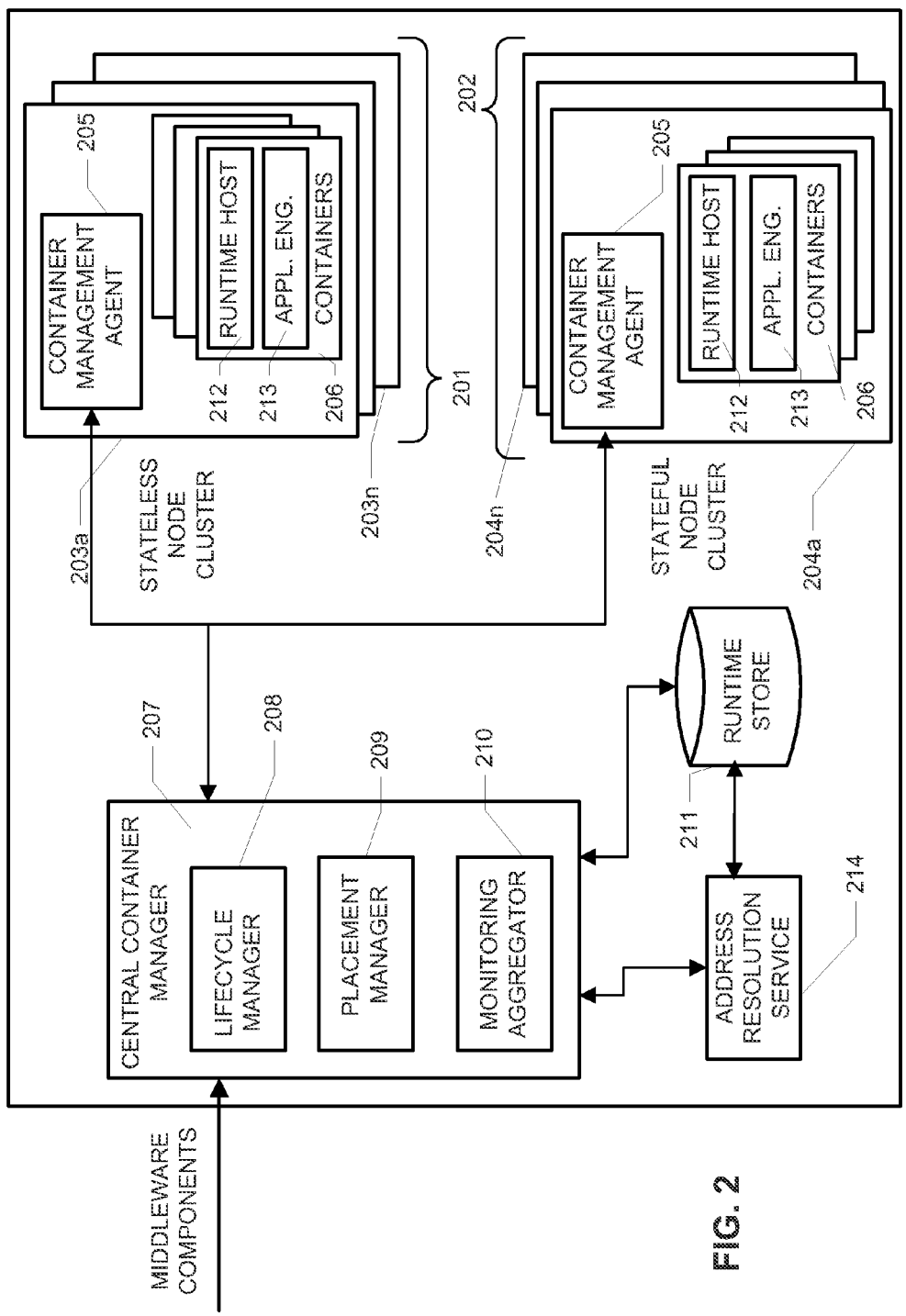
FIG. 2 is a block diagram illustrating an alternative embodiment of the container service.

FIG. 2 is a block diagram illustrating an alternative embodiment of the container service. Container service 200 comprises two compute node clusters 201 and 202. Cluster 201 comprises stateless compute nodes 203a-n, and cluster 202 comprises stateful compute nodes 204a-n. Each stateless and stateful compute node 203, 204 comprises a container management agent 205 and one or more containers 206. In one embodiment, the container management agent 205 is a worker process manager and containers 206 are worker processes.

Container manager 207 receives middleware components from external services, such as a composite application service. Based upon the middleware components received, the container manager 207 determines how many instances of the modules are required and maps module instances to specific machines or compute nodes 203, 204. Container manager 207 comprises lifecycle manager 208, placement manager 209 and monitoring aggregator 210. Lifecycle manager 208 stores middleware components to runtime store 211 and starts/stops module instances on compute nodes 203, 204. The middleware components designate scale characteristics for each module, such as a required number of module instances. Placement manager determines how many module instances are required and assigns those module instances to particular compute nodes 203, 204. Container management agents 205 on the assigned compute nodes activate the designated number of containers 206 and access the middleware components on runtime store 211 to load the module instances on the containers. Monitoring aggregator 210 monitors resource usage by module across compute nodes 203, 204 and aggregates or redistributes the module instances as needed to increase efficiency of container service 200.

Container management agent 205 assigns a limited set of rights to each module to ensure that the middleware components are properly sandboxed and do not interfere with other modules running on the compute nodes 203, 204. Containers 206 comprise runtime host 212 and application engine 213. Runtime host 212 tracks memory allocations for the container and manages memory usage by the module instance running on the container. The module instance runs on application engine 213. Multiple application engines 213 are established on each container to support a plurality of module instances.

Container service 200 also comprises address resolution service 214. Tenants address messages to logical addresses for the module instances. Address resolution service 214 translates the logical addresses to physical addresses for containers 206 and application engines 213 that run the targeted module instance. When module instances are aggregated or when additional module instances are added, address resolution service 214 updates the physical location of the modules which allows the tenant to keep using the same logical address without being concerned with the actual physical location of the module. Address resolution service 214 also tracks the location of the middleware components stored in runtime store 211.

Availability and Reliability.

The container service provides high levels of availability and reliability for the middleware components in the event of compute node failures or scheduled shutdowns. For cloned middleware components, the central container manager creates additional instances of the middleware components on different nodes when the originally assigned node shuts down. For stateful middleware components that have an in-memory state that needs to be protected against failures, the container integrates with the underlying clustering technology to provide replication of state. Primary partitions of the stateful middleware components handle processing workload during normal operations. Secondary replicas, which act as backup copies of the middleware component, are created and placed across fault domains. Any changes in state on the primary partition for a middleware component are replicated to the secondary partition. The fault domains correspond to the basic unit within the container service that would be affected by a power outage or other failure. For example, the basic fault-domain unit may be a switch, a rack, or a data center. Any faults that cause the primary replica of a middleware component to fail result in a secondary replica being upgraded to primary, thus enabling failover of the partitioned components without any data loss.

Figure 3:
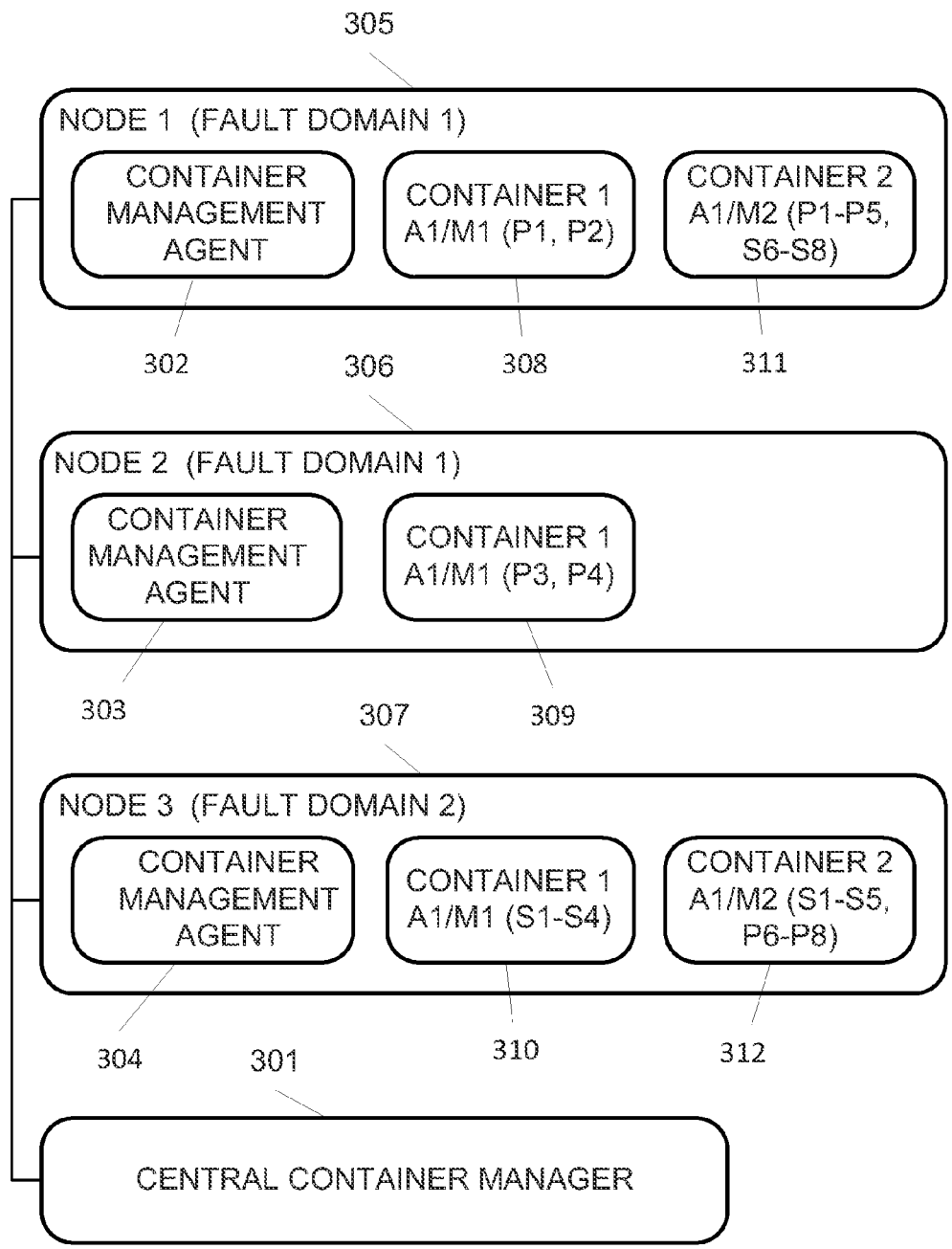
FIG. 3 illustrates the placement of middleware component modules across multiple nodes in an exemplary embodiment.

FIG. 3 illustrates the placement of middleware component modules across multiple nodes in an exemplary embodiment. Central container manager 301 receives middleware components associated with different tenant applications. Each middleware component comprises scale and/or partition information that the central container manager 301 uses to determine how many modules need to be placed on containers and how many nodes should be used. For example, a middleware component may define an application (A1) module (M1) having four partitions (P1-P4) with a scale unit of three, which requires the central container manager 301 to establish four partitions distributed across three compute nodes. Container manager 301 directs container management agents 302-304 on nodes 305-307 to establish specific module instances on containers 308-310.

Container management agent 302 opens container 308 on the first node 305 and loads partitions P1 and P2 of module M1 on container 308. Container management agent 303 opens container 309 on the second node 306 and loads partitions P3 and P4 of module M1 on container 309. Partitions P1-P4 on containers 308 and 309 are the primary partitions on which the module runs. Container management agent 304 opens container 310 on third node 307 and loads partitions S1-S4 on container 310. Partitions S1-S4 are secondary or replica partitions that receive updated data from partitions P1-P4, but that provide no external service. Partitions S1-S4 are usually passive, but become active if one or more of the primary partitions P1-P4 fail.

FIG. 3 further illustrates a second module (M2) for the application (A1) that has been loaded and is running on nodes 305-307. In the illustrated example, central container manager 301 has received a middleware component defining a second module (M2) for the application (A1) having eight partitions (P1-P8) with a scale unit of two. This allows the central container manager 301 to establish eight partitions distributed across two nodes. In one embodiment, container management agent 302, under instruction from central container manager 301, opens container 311 on the first node 305 and loads primary partitions P1-P5 and secondary partitions S6-S8 to run on container 311. Central container manager 301 also directs container management agent 304 to open container 312 on third node 307 and to load primary partitions P6-P8 and secondary partitions S1-S5 to run on container 312.

In the exemplary embodiment illustrated in FIG. 3, nodes 305 and 306 are located on a first fault domain and node 307 is located on a second fault domain. Nodes 305 and 306 may be embodied on a physical or virtual machine hosted on a first rack, for example, and node 307 may be embodied on a physical or virtual machine hosted on a second rack. The racks may be located in the same or different datacenters. Each rack or datacenter may be considered to be a different fault domain. If one rack fails or is taken off-line, then any compute nodes hosted on that rack will be unavailable. In this situation, the compute node or nodes on the other rack can take over as the primary module instances, if needed.

For example, if the first rack fails, then nodes 305 and 306 on that fault domain will be unavailable. As a result, the primary module instance partitions running on nodes 305 and 306 will also fail. The secondary partitions on node 307, which is on a different fault domain, then take over for the failed primary partitions on nodes 305 and 306. In FIG. 3, secondary partitions S1-S4 for module instance M1 are hosted on container 310 and secondary partitions S1-S5 for module instance M2 are hosted on container 312. These secondary partitions are activated when the primary partitions fail and then take over as the primary module instances. This allows the container service to continue running the middleware components without any apparent interruption to external tenants.

Figure 4:
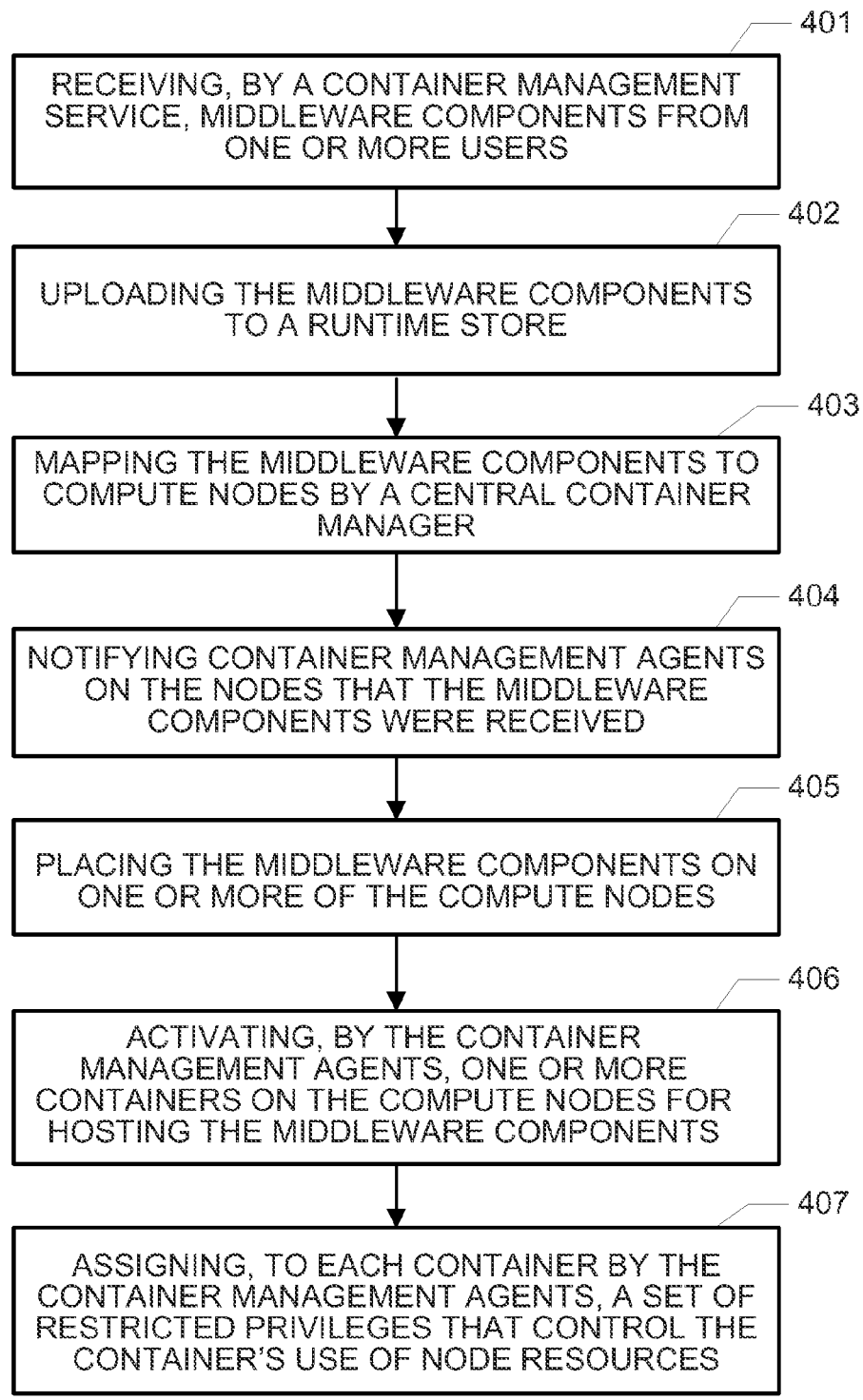
FIG. 4 is a flowchart illustrating an exemplary process for managing middleware components from a plurality of tenants.

FIG. 4 is a flowchart illustrating an exemplary process for managing middleware components from a plurality of tenants. In step 401, a container management service receives middleware components from one or more tenants and uploads the middleware components to a runtime store in step 402. A central container manager maps the middleware components to compute nodes in step 403. In step 404, the central container manager notifies container management agents residing on the compute nodes that the middleware components were received by the container service. In step 405, central container manager places the middleware components on one or more of the compute nodes. The container management agents activate one or more containers on their respective compute nodes for hosting the middleware components in step 406. In step 407, the container management agents assigning a set of restricted privileges to each container. The restricted privileges control the container's use of shared compute node resources to ensure that each container operates in a sandbox manner wherein the containers only use their fair share of common resources and do not interfere with the operation of other the containers on the compute node.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for hosting middleware components for a plurality of tenants, the method comprising:
   mapping middleware components to a plurality of compute nodes, each of the compute nodes comprising a container management agent and one or more containers;
   organizing the plurality of compute nodes into one or more clusters based upon whether the compute nodes are running stateful or stateless middleware components;
   placing individual ones of the middleware components onto a mapped compute node; and
   placing the individual ones of the middleware components into one or more containers on each of the mapped compute nodes by the container management agent, the containers hosting the operation of the one or more of the middleware components.

2. The method of claim 1, further comprising:
   assigning a set of privileges to each middleware component, wherein the privileges control the middleware component's access to shared resources on the compute node.

3. The method of claim 1, further comprising:
   determining a scale factor for a stateless middleware component; and
   cloning the middleware component on a number of compute nodes corresponding to the scale factor.

4. The method of claim 1, further comprising:
   determining a scale factor for a stateful middleware component; and
   placing partitions across a number of compute nodes corresponding to the scale factor, wherein the partitions correspond to containers hosting instances of the middleware component.

5. The method of claim 1, further comprising:
   placing secondary replicas of the individual ones of the middleware components onto compute nodes located on a different fault domain than the mapped compute nodes.

6. The method of claim 5, further comprising:
   activating the secondary replicas of the individual ones of the middleware components when a corresponding primary middleware component is unavailable.

7. The method of claim 1, further comprising:
   receiving the plurality of middleware components at a central container manager; and
   uploading the plurality of middleware components to a runtime store by the central container manager.

8. A system for hosting middleware components, comprising:
   a central container manager adapted to receive middleware components from a plurality of tenants;
   a plurality of compute nodes coupled to the central container manager, the plurality of compute nodes are organized into clusters based upon whether the compute nodes are hosting stateless or stateful middleware components;

one or more containers on each of the plurality of compute nodes, the containers adapted to host the middleware components; and a container management agent on each of the plurality of compute nodes, the container management agent adapted to control the one or more containers.

9. The system of claim 8, wherein each of the plurality of compute nodes further comprise shared resources that are used by the containers.

10. The system of claim 9, wherein the container management agent assigns a set of privileges to each container, the set of privileges controlling each container's access to the shared resources.

11. The system of claim 8, wherein the central container manager further comprises:
   a monitoring aggregator adapted to monitor resource usage across the plurality of compute nodes and to aggregate instances of the middleware components.

12. The system of claim 8, wherein the central container manager further comprises:
   a placement manager adapted to identify a number of module instances required for the received middleware components and to assign the module instances to particular ones of the compute nodes.

13. The system of claim 12, wherein the placement manager is further adapted to identify a number of partitions required for the received middleware components and to establish the partitions on the particular ones of the compute nodes.

14. The system of claim 13 further comprising:
an address resolution service capable of mapping logical addresses for the middleware components to physical addresses for compute nodes on which the middleware components are hosted.

15. The system of claim 8, further comprising:
a runtime store coupled to the central container manager, the runtime store adapted to store the middleware components for use by the container management agent.

16. A method, comprising:
receiving one or more module instances of a middleware component at a mapped compute node;
activating one container on the compute node for each module instance mapped to that compute node;
hosting the module instances on the activated containers; and
identifying a requirement to scale out middleware components that are currently hosted on the containers;
cloning module instances onto the containers for stateless middleware components; and
creating additional partitions on the containers for module instances associated with stateful middleware components.

17. The method of claim 16, further comprising:
monitoring resource usage levels for each of the module instances; and
redistributing the module instances among the containers or to other compute nodes to maintain a balanced load across each of the mapped compute nodes.

18. The method of claim 16, further comprising:
assigning each module instance a set of privileges that control the module instance's access to shared resources on the compute node.

* * * * *

UNITED STATES PATENT AND TRADEMARK OFFICE
CERTIFICATE OF CORRECTION

| | | |
|---|---|---|
| PATENT NO. | : 8,468,548 B2 | Page 1 of 1 |
| APPLICATION NO. | : 12/972411 | |
| DATED | : June 18, 2013 | |
| INVENTOR(S) | : Kulkarni et al. | |

It is certified that error appears in the above-identified patent and that said Letters Patent is hereby corrected as shown below:

On the title page, item (56), under "Other Publications" column 2, line 1, delete "Availabilty" and insert -- Availability --, therefor.

In the Claims,

In column 10, lines 14-15, In Claim 16, after "containers;" delete "and".

Signed and Sealed this
Tenth Day of February, 2015

Michelle K. Lee
*Deputy Director of the United States Patent and Trademark Office*